UNITED STATES PATENT OFFICE.

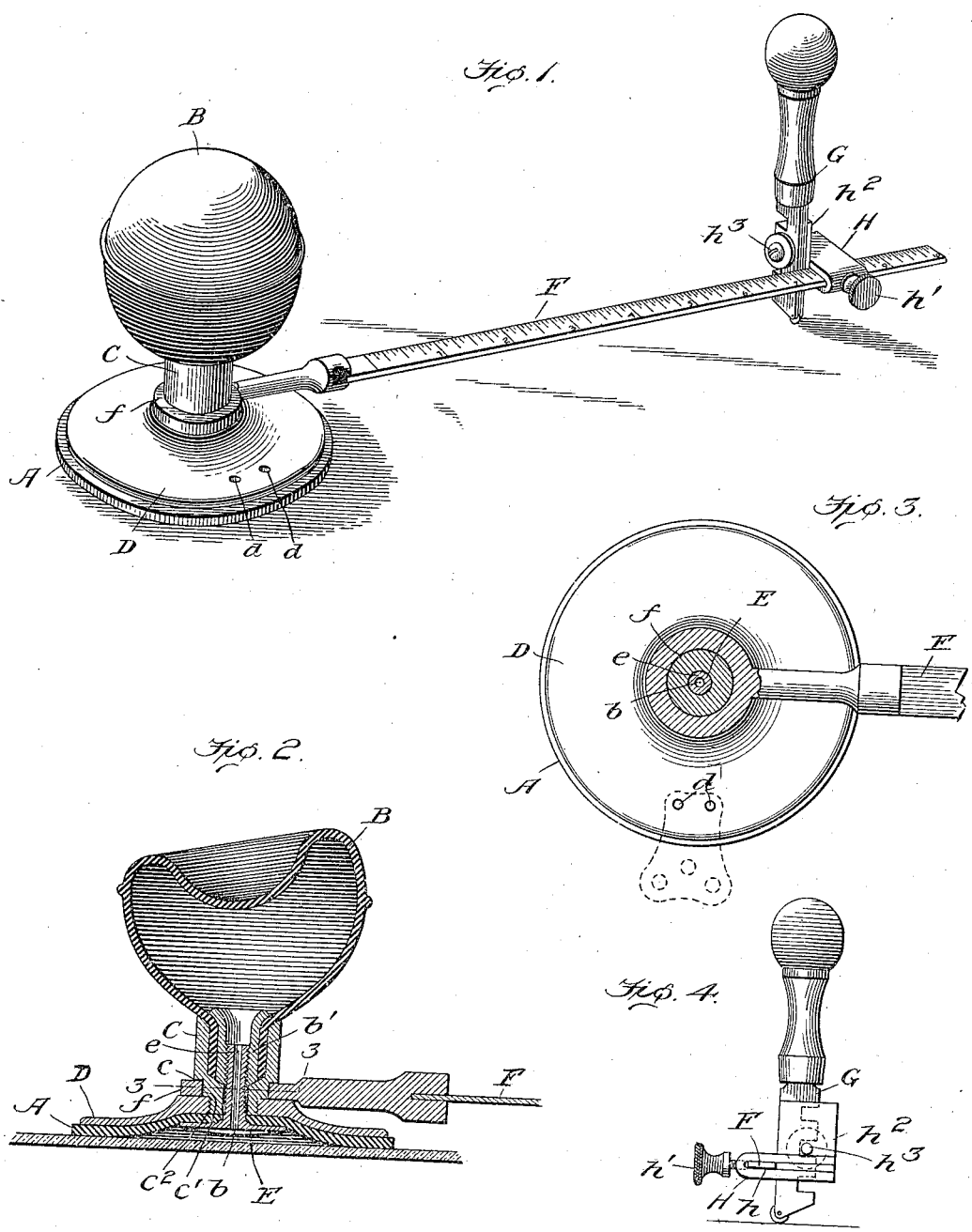

JAMES W. BRAID, OF NASHVILLE, TENNESSEE.

DEVICE FOR TEMPORARILY MAINTAINING A FIXED POINT OR CENTER ON PLANE SURFACES.

953,407.  Specification of Letters Patent.  Patented Mar. 29, 1910.

Application filed October 9, 1909. Serial No. 521,849.

*To all whom it may concern:*

Be it known that I, JAMES W. BRAID, a citizen of the United States, residing at Nashville, in the county of Davidson and State of Tennessee, have invented certain new and useful Improvements in Devices for Temporarily Maintaining a Fixed Point or Center on Plane Surfaces; and I do hereby declare the following to be a full, clear, and exact description of the invention, such as will enable others skilled in the art to which it appertains to make and use the same.

My invention relates to that class of devices employed for temporarily maintaining a fixed point or center on plane surfaces, such, for example, as panes or sheets of glass, which are to be drilled or to be cut into curved shapes and upon which, owing to the character of the surface operated upon, the tool is liable to slip or move irregularly.

In carrying out my invention I combine with a friction plate adapted to be closely applied to a plane surface, an automatically expansible device forming a rarefaction chamber which is adapted to rarefy the air beneath said friction plate and to compensate for any leakage thereunder, and such a combination of elements embraces the main feature of my invention.

As a specific means for effecting the results before noted, I prefer to combine with a friction plate a compressible bulb having its interior connected by a suitable passage with a port or vent which opens through the under side of said friction plate, and such a construction embodies a further feature of my invention.

There are other, minor, features of invention residing in particular combinations and elemental features of construction, all as will hereinafter more fully appear.

In the drawings chosen for the purpose of illustrating my invention, the scope of which will be pointed out in the claims, Figure 1 is a perspective view of a centering device embodying my invention, showing its application to a sweep glass cutter for cutting circular disks from sheets of glass; Fig. 2 is a vertical central section of the bulb and friction plate, shown in Fig. 1 of the drawing; Fig. 3 is a sectional view taken in the plane of the line 3—3, Fig. 2, an attached templet being shown in dotted line; and Fig. 4 is an end view of the sweep with a side view of one form of cutter and means for adjustably securing the cutter to the sweep.

Like symbols refer to like parts wherever they occur.

I will now proceed to describe my invention more fully, so that others skilled in the art to which it appertains may apply the same.

In the drawings, A indicates a friction plate which is adapted to be applied closely to a plane surface, such, for instance, as a sheet of glass. This plate may be of any suitable material which will so apply itself to the surface to be operated upon as to minimize leakage of air between the friction plate and said surface, and which will also resist any tendency of the friction plate to accidentally slide on said surface. For this purpose rubber, leather or equivalent yielding material will be found desirable. It will also be found desirable to dish or concave this friction plate only to such an extent as may be necessary to permit the means by which it is secured to the device forming the rarefaction chamber to clear the surface of the article to which it is to be applied, as the capacity of the bulb to maintain a diminished air pressure is thus increased.

B indicates a device forming a rarefaction chamber which is connected with a port or vent in the friction plate by means of a passage $b$, or in other suitable manner. This rarefaction chamber should be of such a character that, after its volume has been decreased to thus expel the air from the chamber and the friction plate has been applied to the surface upon which it is to be mounted, said chamber will automatically expand or increase in volume so as to rarefy not only the air which is trapped between the friction plate and the surface to which it has been applied, but also to continue to rarefy any air which may thereafter leak under said friction plate. As readily obtainable and well adapted for this purpose, I prefer, as illustrated in the drawing, to employ a rubber bulb, which may be conveniently connected with the friction plate A by means of a suitable collar C, disk D, tubular clamp screw E and threaded bushing $b'$. When the rubber bulb B is utilized to form the rarefaction chamber its neck is preferably vulcanized to the bushing $b'$, which is threaded on its interior for the reception of the correspondingly threaded shank $e$ of the tubular clamp screw E.

C indicates a collar which embraces and confines the neck of the bulb. This collar is reduced in diameter at $c$ and again at $c'$ to form two shoulders, the first of which serves, in conjunction with the disk D, to maintain the proper operative position of the eye $f$ formed on the sweep F that carries a cutter G, and the second of which engages the disk D and limits its movement with respect to the collar C, as will be readily understood. The disk D, which is preferably formed with a centrally disposed threaded orifice for the reception of the correspondingly threaded lower end of the collar C, may be provided with perforations or holes $d, d$ which afford means for attaching a templet thereto when it is desired to employ the device for the purpose of maintaining a templet in fixed position. An attached templet is indicated in dotted lines, Fig. 3 of the drawings. The friction plate A is also formed with a central orifice for the passage of the threaded stem or shank $e$ of the clamp screw E, the head of said screw preferably extending a considerable distance beyond the margin of said opening.

F indicates a sweep or radius bar which is provided at one end with an eye $f$ by means of which it is journaled on the collar C of the centering device. On this sweep any suitable tool may be mounted. As shown in the drawings, the sweep is especially adapted for the application thereto of a cutter G for the purpose of cutting curved or circular disks from glass or like material. This sweep may be graduated so that by suitably adjusting the cutter thereon a circle or circular arc of any predetermined diameter may be readily cut. In the present instance the cutter G is adjustably mounted on the sweep by means of a slide H having a slot $h$ for the reception of the sweep F and having a set screw $h'$ for securing the slide H in its adjusted position on the sweep. This slide preferably also has a vertically disposed flange $h^2$ and a second set screw $h^3$ for clamping the cutter to the slide, and as the glass cutter G, which is illustrated as of the usual, well known form, is provided with a series of open slots or recesses, said cutter may be so secured in the clamp as to utilize the spring or elasticity of the sweep F to obtain any desired pressure of the cutter on the glass.

The construction of the several elements of the device being substantially of the character hereinbefore pointed out, the said parts may be assembled by passing the lower end of the collar C through the eye $f$ of the sweep F and screwing the disk D on the threaded end of said collar, after which the neck of the bulb B with its bushing $b'$ may be inserted in the collar C and the threaded stem $e$ of the tubular clamp screw E may be passed through the central orifice in the friction plate A and screwed into the bushing. It will be noted that when the tubular screw E is screwed home the friction plate A will be tightly clamped to the disk D and to the lower end of collar C and that the neck of the bulb B will be tightly drawn into the collar C, so that air-tight joints between the several parts are secured.

The construction of the devices being such as hereinbefore set forth, their operation will be as follows: The volume of the rarefaction chamber is first reduced by compressing the bulb B and the friction plate A is then applied uniformly to the sheet of glass or other surface upon which it is desired to temporarily establish and maintain a fixed point or center, after which the pressure upon the bulb is released, thus allowing said bulb to expand and cause the rarefaction of any air remaining beneath the friction plate. When the device is thus applied, the preponderating external atmospheric pressure will retain the friction disk in fixed contact with the surface of the article to be operated upon.

As will be readily understood, the bulb forming the rarefaction chamber will not expand to its full capacity when first released, but will thereafter expand gradually to compensate for any leakage which may occur between the friction plate A and the surface to which it is applied.

In case the article is to be drilled or figures other than circular are to be cut, the sweep F may be dispensed with and a templet of the desired form secured to the disk D which covers the friction plate. It will be noted that owing to the character of the construction a limited rocking motion of the bulb B, collar C, and disk D on the friction plate A may occur without affecting the close contact of the friction disk with the surface of the article to which it is attached.

Having thus described my invention, what I claim and desire to secure by Letters Patent is:

1. In a device for temporarily maintaining a fixed point on an article to be operated upon, the combination of a friction plate and a device forming an automatically expansible rarefaction chamber which communicates with the under surface of the friction plate.

2. In a device of the character indicated, the combination of a friction plate, a compressible bulb of resilient material, and means forming a passage leading from the interior of the bulb to the under surface of the friction plate.

3. In a device of the character indicated, the combination with a friction-plate, and a compressible bulb of resilient material which communicates with the under surface of the friction plate, of a disk which rests upon the upper surface of the friction plate and is provided with means for the attachment of a templet.

4. In a device of the character indicated, the combination with a friction plate, of a compressible bulb of resilient material having a neck provided with an interiorly threaded bushing, and a tubular clamp screw for engaging said bushing.

5. In a device of the character indicated, the combination with a friction plate, of a compressible bulb of resilient material which communicates with the under surface of the friction plate, said bulb having a neck provided with a bushing, a collar which encircles the neck of the bulb, a sweep journaled on said collar, and means for connecting the friction plate with the bulb.

6. In a device of the character indicated, the combination with a friction plate, of a compressible bulb of resilient material, said bulb having a neck, a threaded bushing within the neck of the bulb, a collar which encircles the neck of the bulb, a disk engaging said friction plate, and a tubular clamp screw connecting the bushing and friction plate.

7. In a device of the character indicated, the combination with a friction plate, of a compressible bulb formed of resilient material and having a neck, a threaded bushing mounted in the neck of said bulb, a collar encircling the neck of said bulb, and a tubular clamp screw engaging said friction plate and bushing.

In testimony whereof I affix my signature, in presence of two subscribing witnesses.

JAMES W. BRAID.

Witnesses:
J. C. SNODGRASS,
GEO. C. DURG.